UNITED STATES PATENT OFFICE.

CARL RACH, OF STAPLETON, NEW YORK.

PROCESS OF MAKING BEER.

1,163,454.      Specification of Letters Patent.      Patented Dec. 7, 1915.

No Drawing.      Application filed October 11, 1911. Serial No. 654,013.

*To all whom it may concern:*

Be it known that I, CARL RACH, a subject of the King of Prussia, and residing at Stapleton, in the county of Richmond and State of New York, have invented a certain new and useful Process of Making Beer, of which the following is a specification.

My invention relates to the process of making beer and particularly to the kraeusening step therein, the object of my invention being to produce a cheaper and better beer by the use of a novel kraeusening wort and process.

Beer as now commonly brewed, and by beer I mean to include both bottom fermented beer, (lager beer) and top fermented beer (sparkling ales),—is made from a beer wort which, after fermentation, is stored and finally finished by artificial carbonation or by the kraeusening process. The latter process consists in adding to the fully fermented wort a suitable quantity of a new wort which has entered the first stage of fermentation; so that the continued fermentation caused by the addition of this fresh wort produces fermentation carbonic acid gas which gives the beer its desired sparkle and life. After fining, the fermented wort finally represents the product called beer which is filtered and run into small casks for transportation to the consumer.

The common practice is to make the kraeusening wort of the same character and constituents as the main wort so that the only difference lies in the fact that the main or fermentation wort has been completely fermented, while the kraeusening wort has but just reached the first stage of fermentation. I have discovered however that the quality and character of the beer may be greatly influenced, as to taste, appearance, keeping qualities and alcohol content, by differentiating the kraeusen-wort from the main beer wort. While the primary function of this kraeusen-wort is of course to produce the properties of the beer, I have found that it may also be used to add to the palatability, and foam-keeping qualities of the beer. It should comprise for the most part, unfermentable matter such as dextrin, a sufficient quantity of sugar to insure the production of carbonic acid gas, and only a very small percentage of soluble albuminoids inasmuch as the latter disturb the brilliancy and keeping qualities of the beer. I therefore propose to make a kraeusen-wort of a different chemical composition from the main beer wort in order to attain the characteristics mentioned. The main beer wort I make, as usual, rich in soluble albuminoids and peptones in order to produce a sound and thorough fermentation and to allow the proper development of the beer yeast; while on the other hand I make a kraeusen-wort having a very small percentage of soluble albuminoids and peptones, but possessing a sufficient percentage of malt sugar to produce a sufficiently large quantity of carbonic acid gas during the kraeusening process. The beer wort proper therefore, I make with an abundance of malt, while the kraeusen-wort I make with as little malt as possible. For example, for the beer wort I use a mixture of malt and raw grain in which the percentage of malt is not less than 50% of the total weight. The beer wort from this is produced according to well established brewhouse methods. For the kraeusen-wort however, I use a mixture of malt and raw grain in which the percentage of malt is lower than that of the raw cereals and preferably very much lower. I have found indeed that an excellent kraeusen-wort may be made when using as low as 5% malt; and preferably the malt employed for the kraeusen-wort should never exceed 20% to 30% of the raw grain used.

As an illustration of my process, the following example may be given, of the manner in which say 100 barrels of beer is made. For this quantity of beer 80 barrels of ordinary beer wort is required and 20 barrels of kraeusen-wort. For the 80 barrels of ordinary beer wort I take for example 2,000 lbs. malt and 2,000 lbs. corn grits. The malt is mashed in water at 90° F., one barrel of water for each 100 lbs. malt being used in the usual mash filter tub. The 2,000 lbs. corn grits are mashed in 20 barrels of water at 115° F. in the usual corn cooker, the mash being gradually raised to boiling point (212° F.) and boiled for about an hour. The malt and raw grain mashes are then mixed bringing the temperature of the mixture to about 165° F., which is maintained for about forty-five minutes and the sweet liquid called beer wort then drawn off, fifty barrels of sparging water being added to allow for 10 barrels water remaining in the grains in the filter-tub. The collected worts are then boiled for an hour and a half with about 40 lbs. hops. The hopped wort is then strained off, cooled and mixed with about 80 lbs. yeast, fermented and after fermentation is run into cellar storage casks. For the 20 barrels of kraeusen-wort I take 900 lbs. grits, mash in 10 barrels of water at 115° F., raise the temperature of this mash to the boiling point and cook for one hour. The grits mash I run into 10 barrels cold water in the mash tub, where resulting temperature of 165° F. is obtained. In this mash I now mix 100 lbs. finely ground malt and allow the same to stand until substantially all the starch present is transformed into dextrin and sugar. Whereupon I transfer the mash to a filter-press. The turbid wort is then passed through this filter-press where it is clarified, into a kettle, where it is boiled for an hour and a half with 10 lbs. hops. The hopped wort is then passed through the hop strainer and cooled to fermenting temperature. To this wort 20 lbs. yeast is added, and fermentation allowed to set in, after which this kraeusen-wort is added to the properly fermented 80 barrels of beer wort. The mixture of beer wort and kraeusen-wort is fined and stored several weeks until it has acquired the desired degree of ripeness after which time it is filtered and filled into the usual small transportion casks.

Obviously the proportions stated are given merely by way of example and are by no means to be considered as arbitrary limitations of the process.

The novelty of my process lies in the substantial differentiation of the kraeusen-wort from the beer wort, by which the composition, quality and character of the finished beer may be very greatly influenced. It may be added furthermore that the use of the small proportion of malt to raw grain in the kraeusen-wort materially lessens the cost of producing the beer by reason of the lower cost of raw grain over malt. At the same time it is obvious that the resulting product will in any case possess a sparkle equal to that of any beer now prepared by the kraeusening process, and at the same time will remain clearer and free from sediment since the kraeusen-wort carried into the beer wort a much lower proportion of albuminoids and peptones than the kraeusen-wort now commonly employed.

I claim as my invention:

1. A method of kraeusening beer which consists in adding to a fermented beer wort, a kraeusen-wort made from a mash in which the raw grain predominates over the malt, for the purpose described.

2. A method of kraeusening beer which consists in adding a kraeusen-wort made from a mash in which the raw grain predominates over the malt, to a fermented beer wort made from a mash in which the percentage of malt is at least equal to that of the raw grain used.

3. A method of kraeusening beer which consists in preparing a fermented beer wort from a mash in which the percentage of malt is at least equal to that of the raw grain used, subsequently preparing a kraeusen-wort by mashing a mixture of raw grain and malt in which the percentage of raw grain largely exceeds the percentage of malt, passing this mash through a filter press after the starch present in the mash has been converted into maltose and dextrin, boiling the extracted wort with hops, straining the hopped wort, pitching the same with yeast after cooling and adding to the beer the thus prepared kraeusen-wort after initial fermentation has begun, substantially as described.

4. A method of kraeusening beer which consists in adding to a fermented beer wort a kraeusen-wort made from a mash in which the malted grain does not exceed 30 per cent. of the total grain used.

5. A method of kraeusening beer which consists in preparing from a mash comprising not less than fifty per cent. by weight of malt, a fermented beer rich in soluble albuminoids and peptones, preparing from a mash comprising not over thirty per cent. malt, a kraeusening wort rich in dextrins but poor in albuminoids and peptones, and adding said wort in suitable proportions to the beer, substantially as described.

In testimony whereof I have signed my name to this specification, in the presence of two subscribing witnesses.

CARL RACH.

Witnesses:
 WALTER ABBE,
 M. E. KEIR.

Copies of this patent may be obtained for five cents each, by addressing the "Commissioner of Patents, Washington, D. C."